United States Patent [19]
Wagner et al.

[11] Patent Number: 5,523,938
[45] Date of Patent: Jun. 4, 1996

[54] DIFFERENTIAL CURRENT FAULT PROTECTION FOR AN AC/DC HYBRID SYSTEM AND METHOD THEREFOR

[75] Inventors: Carl Wagner; Hassan Mansir; Kurt Duesterhoeft, all of Rockford, Ill.

[73] Assignee: Sundstrand Corporation, Rockford, Ill.

[21] Appl. No.: 485,407

[22] Filed: Jun. 7, 1995

[51] Int. Cl.$^6$ .............................. H02H 7/125; H02H 3/18
[52] U.S. Cl. .................................... 363/53; 361/87
[58] Field of Search .................. 363/44, 45, 50, 363/52, 53, 76, 81, 84; 361/63, 87, 93

[56] References Cited

U.S. PATENT DOCUMENTS

| | | | |
|---|---|---|---|
| 4,173,774 | 11/1979 | Hyvarinen et al. | 361/87 |
| 4,321,645 | 3/1982 | Thom et al. | 361/63 |
| 4,486,801 | 12/1984 | Jackovich et al. | 361/21 |
| 4,595,965 | 6/1986 | Glennon | 361/20 |
| 5,047,890 | 9/1991 | Kessler | 361/93 |
| 5,309,311 | 5/1994 | Ballada | 361/87 |
| 5,400,238 | 3/1995 | Brown | 363/53 |
| 5,406,470 | 4/1995 | Ridley et al. | 363/53 |
| 5,414,613 | 5/1995 | Chen | 363/52 |

*Primary Examiner*—Matthew V. Nguyen
*Attorney, Agent, or Firm*—Jeffery J. Makeever

[57] ABSTRACT

A system of protection for an AC/DC hybrid electric power generation and distribution system having an AC portion comprising at least one source of AC power producing AC current coupled by first power feeders to a DC portion comprising at least one AC to DC converter producing DC current, the DC current being coupled by second power feeders to utilization equipment, comprises AC current sensors producing current sense signals proportional in magnitude to the AC current and DC current sensors producing current sense signals proportional in magnitude to the DC current. The AC current sensors define an entrance to a zone of protection, and the DC current sensors define an exit from the zone of protection. The AC and DC current sense signals are relationally compared to detect the presence of a differential current fault within the zone of protection. The protection system further discriminates the location of the fault between the AC portion and the DC portion of the hybrid power system by monitoring the ripple content in the sensed AC current. The relationship function utilized varies with the type of AC to DC conversion equipment to compensate for the power loss and transformer step up or down ratio (if used) to ensure tracking of the current level between AC current and DC output current. In addition to differential current fault protection, the instant invention detects shorted and open rectifiers, phases, and sensors.

17 Claims, 5 Drawing Sheets

DIFFERENTIAL CURRENT FAULT PROTECTION FOR AN AC/DC HYBRID SYSTEM AND METHOD THEREFOR

FIELD OF THE INVENTION

The present invention relates to protection systems for electric power generation and distribution systems, and more particularly to a system and method of protection for sensing differential current faults in a hybrid electric power system having both alternating current and direct current generation and distribution.

BACKGROUND ART

Aircraft electric power generation and distribution systems typically utilize multiple generators driven by the aircraft engines and coupled by hundreds of feet of power feeders to supply the various electrical loads distributed throughout the aircraft with electrical energy. Safety concerns about the risk of fire and loss of electrical power resulting from a short circuit on a main power feeder on the aircraft have driven engineers to develop very sophisticated protection systems to guard against such faults. Because at least some of the electric current generated by the generator flows into the short circuit, depending on the impedance of the fault, a difference exists between the current generated by the generator and that which is actually delivered to the aircraft loads. Modern protection systems sense this differential current flow, and allow proper isolation of the fault before damage is sustained to the aircraft.

The most common method of detecting these differential current faults is to measure current flow at two or more points in the power system. These measurements are then compared to determine if there are any differences in the current magnitude. Since, in the absence of any fault, there is no current loss along a feeder, any difference in current magnitude is the result of current flowing via unintended paths. These unintended paths represent faults on the system and must be isolated. Conventional AC power systems use well matched AC transformers to measure the current flow out of the source and into the loads. The output of these two sets of transformers are then directly compared to determine the presence of a fault. Examples of such systems may be found in U.S. Pat. Nos. 4,173,774; 4,321,645; and 5,047,890 assigned to the assignee of the instant invention.

Some modern aircraft are being developed utilizing equipment requiring a 'hybrid' electric power system comprising AC, low voltage DC (typically 28 Vdc), and/or high voltage DC (typically 270 Vdc) power generation. The specific components vary among differing configurations, but typically include an AC generator whose output is coupled both to utilization equipment for supplying AC power thereto and to some type of AC to DC conversion equipment, such as a rectifier filter, or a step-up or step-down transformer rectifier unit (TRU). The output of the AC to DC conversion equipment then supplies DC power to utilization equipment requiring such power.

A problem with this type of system, illustrated in simplified single line form in FIG. 1, concerns providing adequate protection from faults allowing current to flow along unintended paths, or differential current faults. Conventional methods of protection sense the AC current generated by the generator 100 and that which is delivered to the loads to determine if a differential current fault exists on the AC system 102, and sense the DC current converted by the AC to DC conversion equipment 104 and that which is delivered to the DC loads to determine if a differential current fault exists on the DC system 106. In addition to this type of protection system requiring at least four (4) points of sensing current 108, 110, 112, and 114 and at least two separate comparison circuits 116 and 118, it also leaves the AC to DC conversion stage 104 unprotected, i.e. a differential current fault caused by a short circuit within the AC to DC conversion equipment itself is not within the zone protected by the AC protection 102, nor within the zone protected by the DC protection 106. Sustained operation with such a fault within the conversion equipment 104 may result in serious damage to the equipment and potentially the aircraft itself.

Protection for internal AC to DC conversion equipment faults has typically been accomplished by a separate circuit which monitors the peak-to-peak AC voltage of the DC output. Upon the occurrence of a fault, such as a shorted rectifying diode, the output ripple of the DC voltage would increase, and the fault would be detected. This sensing may not detect many rectifier diode open and some shorted diode failures, however, because the sensing threshold, which is set to coordinate with the expected normal waveform disturbances caused by load or source variations, is necessarily set too high. A lowering of the threshold, while allowing more of these types of faults to be detected, will also result in false indications of a fault during normal, unfaulted conditions as various loads are connected and disconnected to the system.

The instant invention overcomes these problems by providing a system of protection which minimizes the number of components and circuitry required to sense both distribution and internal conversion failures while maximizing the zone of protection to include both AC generation and distribution equipment and AC to DC conversion and distribution equipment.

SUMMARY OF THE INVENTION

It is the principle objective of the instant invention to provide a new and improved system and method of protection for AC/DC hybrid electric power generation and distribution systems. More specifically, it is the principle objective of the instant invention to provide a system and method of protection for an AC/DC hybrid electric power generation and distribution system which provides a zone of protection against differential current faults which encompasses both the AC and the DC power generation and distribution equipment. It is a further object of the instant invention to provide a system and method of protection which additionally detects internal failures within the AC to DC conversion equipment including, but not limited to, open rectification diodes, shorted rectification diodes, open phase, et cetera. It is yet a further objective of the instant invention to provide a system and method of protection which differentiates between faults occurring in the AC and those occurring in the DC portions of the hybrid system. It is a still further object of the invention to provide a system and method of protection which relates the AC current to the DC current via a proportional, linear function which compensates for power loss and transformer step up or down ratio (if used) to ensure tracking of the AC current and the DC current for systems utilizing differing AC to DC conversion equipment, e.g., rectifier/filters, step-up or step-down transformer rectifier units (TRUs), etc.

In a preferred embodiment of the instant invention, a system of protection for an AC/DC hybrid electric power generation and distribution system having an AC portion comprising at least one source of AC power producing AC current coupled by first power feeders to a DC portion comprising at least one AC to DC converter producing DC current, the DC current being coupled by second power feeders to utilization equipment, comprises AC current sensors producing current sense signals proportional in magnitude to the AC current and defining the entrance to the zone of protection. The protection system further comprises DC current sensors producing current sense signal proportional in magnitude to the DC current and defining the exit from the zone of protection. This preferred system of protection relationally compares the AC current sense signal with the DC current sense signal to detect the presence of a differential current fault within the zone of protection.

Preferably, the AC current sensors are positioned within the AC/DC hybrid electric power generation and distribution system so as to include the source of AC power within the zone of protection. Additionally, the DC current sensors are positioned to include the DC feeders within the zone, thereby maximizing the protection afforded by the instant invention. In a highly preferred embodiment of the instant invention, the system of protection further monitors the current ripple magnitude of the AC current sense signal to determine the presence of an unbalance current fault within the AC/DC hybrid electric power generation and distribution system. Still further, in a preferred embodiment of the instant invention distinguishes between faults within said AC portion from faults within said DC portion of the AC/DC hybrid electric power generation and distribution system by comparing the two detected fault conditions.

A preferred method of protecting a hybrid AC/DC electric power generation and distribution system comprises the steps of sensing the AC current generated by the source of AC power, sensing the DC current produced by the AC to DC converter, comparing the sensed AC current and the sensed DC current through an unfaulted system transfer function, and generating a first fault signal in response to a variance between the sensed AC current and the sensed DC current exceeding the relationship calculated by the unfaulted system transfer function by a first predetermined threshold indicating the presence of a differential current fault. Preferably, the protection method further comprises the steps of monitoring the ripple content of the sensed AC current, Comparing the ripple content to a second predetermined threshold, and generating a second fault signal when the ripple content exceeds the second predetermined threshold indicating the presence of a fault upstream of the AC to DC converter. Further, preferably, the protection method comprises the steps of comparing the first fault signal and the second fault signal, and generating a third fault signal when both the first fault signal and the second fault signal are true, indicating the presence of a differential current fault upstream of the AC to DC converter.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

DESCRIPTION OF THE PREFERRED EMBODIMENTS

Figure 1:
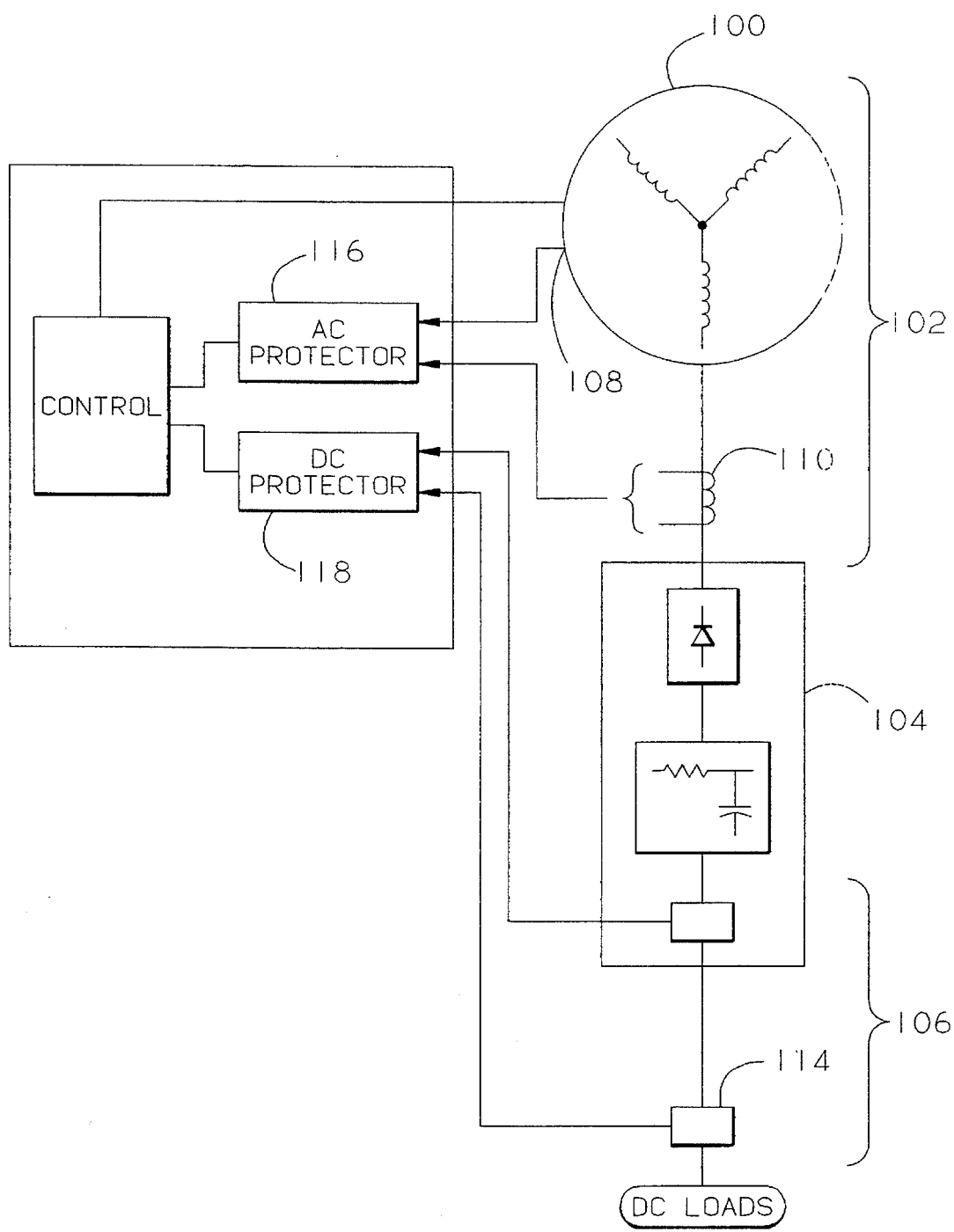
FIG. 1 is a simplified single line schematic of a prior art protection system for a hybrid AC/DC electric power generation and distribution system.
Figure 2:
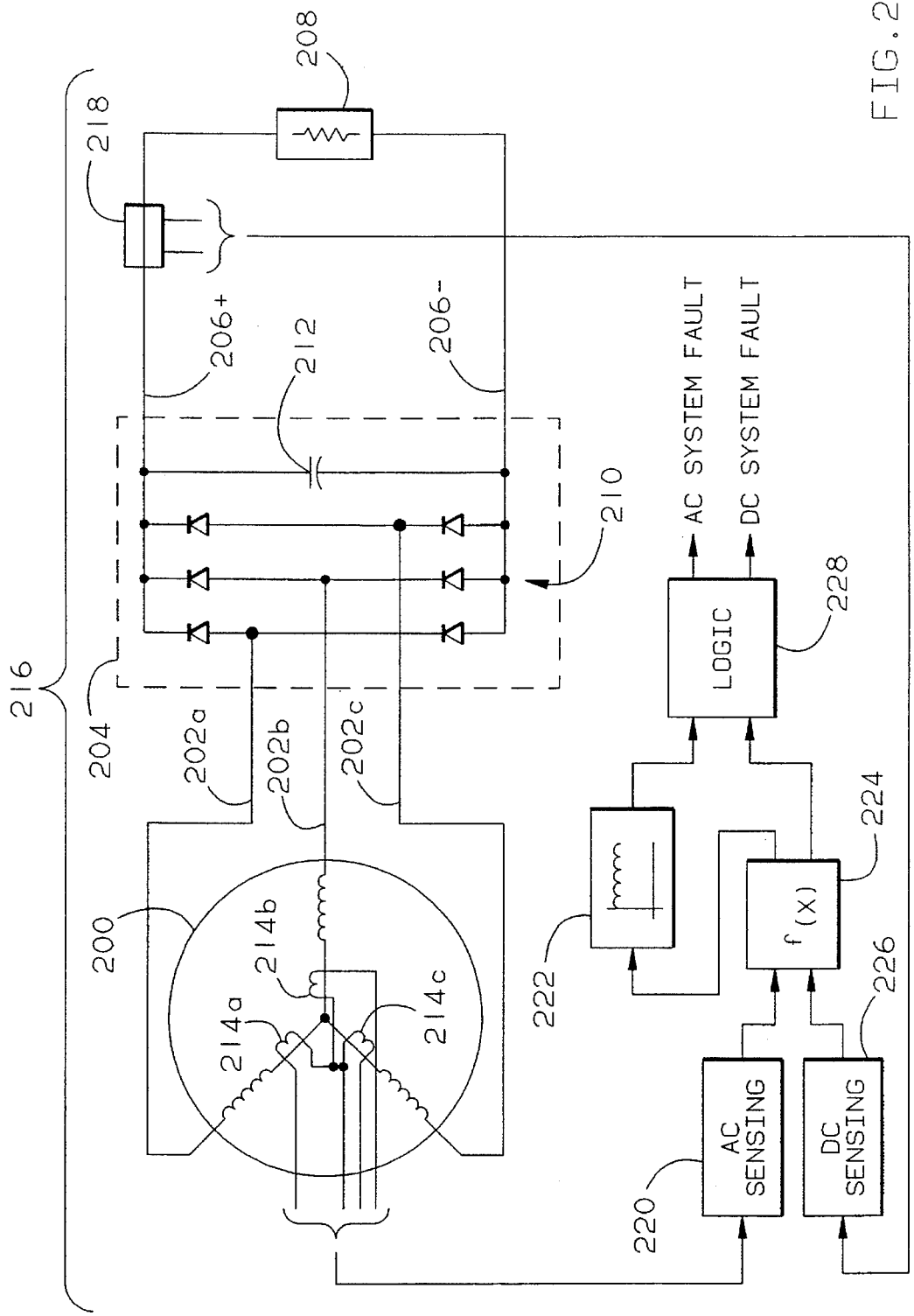
FIG. 2 is a single line block diagram illustrating an exemplary embodiment of the instant invention.

A simplified AC/DC hybrid electric power generation and distribution system is illustrated in block diagram form in FIG. 2, including the protection system of the instant invention. The hybrid system comprises at least one AC generator 200 producing AC current which is coupled by power feeders 202a, 202b, and 202c to at least one AC to DC converter 204 which converts this power to produce DC current. This DC current is coupled by power feeders $206^+$ and $206^-$ to utilization equipment 208. The generator is illustrated in FIG. 2 as a three phase machine, although a machine having more or fewer number of phases may be employed alternatively in other embodiments of the instant invention. Additionally, more than one generator may be utilized as desired by the particular application without departing from the spirit of the invention. As will also be understood by one skilled in the art, the topology of the AC to DC converter 204, while shown in FIG. 2 as a simple rectifier bridge 210 with output capacitor 212, may be varied substantially without impact on the instant invention, e.g., the converter 204 may be a step-up or a step-down transformer rectifier unit (TRU) or other topology. For simplicity and ease of understanding the instant invention, however, the simple bridge rectifier 210 topology will be used.

In a preferred embodiment of the instant invention, a first current sensing means, such as current transformers (CTs) 214a, 214b, and 214c, are positioned to sense the AC current generated by the generator 200 during operation. These CTs 214a–c define the entrance to a zone of protection 216 provided by the instant invention. The exit of this zone of protection 216 is defined by a second current sensing means, such as illustrated schematically as a Hall effect device 218, which senses the DC current delivered to the DC utilization equipment 208. Other AC and DC current sensing means may be utilized as are known and used in the art as appropriate or desired. Preferably, the CTs 214a–c are positioned to include the generator 200 within the zone of protection 216, and the Hall effect device 218 is positioned to include the distribution feeders 206 within the zone of protection 216 to provide maximum fault identification and isolation.

During operation of the hybrid system, the AC current generated by the generator 200 is sensed by CTs 214a–c and communicated to an AC current sensing and conditioning means or circuit block 220 which conditions the incoming current sense signal. The output of this circuit 220 is input to a means for relationally comparing signals, such as relational function comparison circuit 224. Likewise, the DC current converted from the AC current and delivered to the utilization equipment 208 is sensed by the Hall effect device 218 and communicated to a DC current sensing and conditioning means or circuit 226. The output of this circuit 226 is also input to the relational function comparison circuit 224. The output of this circuit 224 is monitored by a means for monitoring ripple, such as monitor circuit block 222. The output of both the ripple monitor circuit 222 and the relational function comparison circuit 224 are input to a logic means or circuit 228. This logic circuit processes the two incoming signals and discriminates the location of a sensed fault between the AC portion of the hybrid system, including the AC to DC conversion equipment 204, and the DC portion of the hybrid system.

Figure 3:
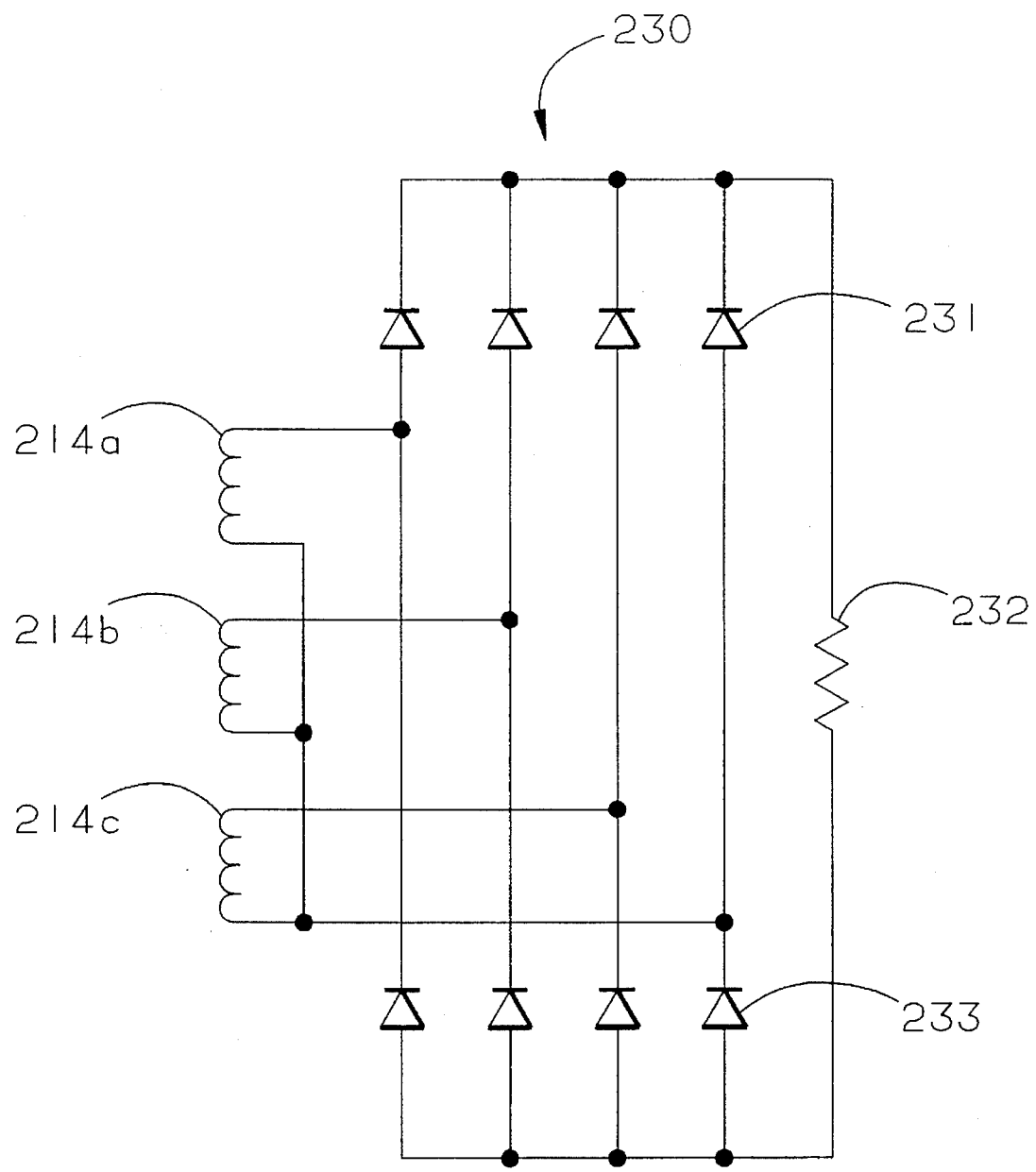
FIG. 3 is a schematic diagram of an AC current sensing and conditioning network in accordance with an exemplary embodiment of the instant invention.

An exemplary embodiment of the AC sensing circuit 220 is illustrated in FIG. 3. The AC current sense signals generated by the CTs 214a–c are summed through a full wave bridge rectifier circuit 230 which additionally includes diodes 231 and 233. These additional rectification diodes 231 and 233 coupled to the return line of the CTs 214a–c greatly improves the accuracy and linearity of the AC to DC conversion, especially during fault conditions. This rectified current sense signal is coupled through burden resistor 232. The voltage developed across resistor 232 contains an AC ripple component which is sensed by circuit 222 of FIG. 2 after it has been processed by the relational function comparison circuit 224. This ripple varies with the balance of the load on the AC portion of the system, and may become severe with any bus fault less than a balanced three phase fault on the AC system, i.e. a single phase-to-ground fault, a phase-to-phase fault, an open phase fault, an open rectifier fault within the AC to DC converter 204, et cetera, may result in excessive ripple across resistor 232. This ripple is sensed by circuit 222 of FIG. 2, which is shown schematically in more detail in FIG. 4.

Figure 4:
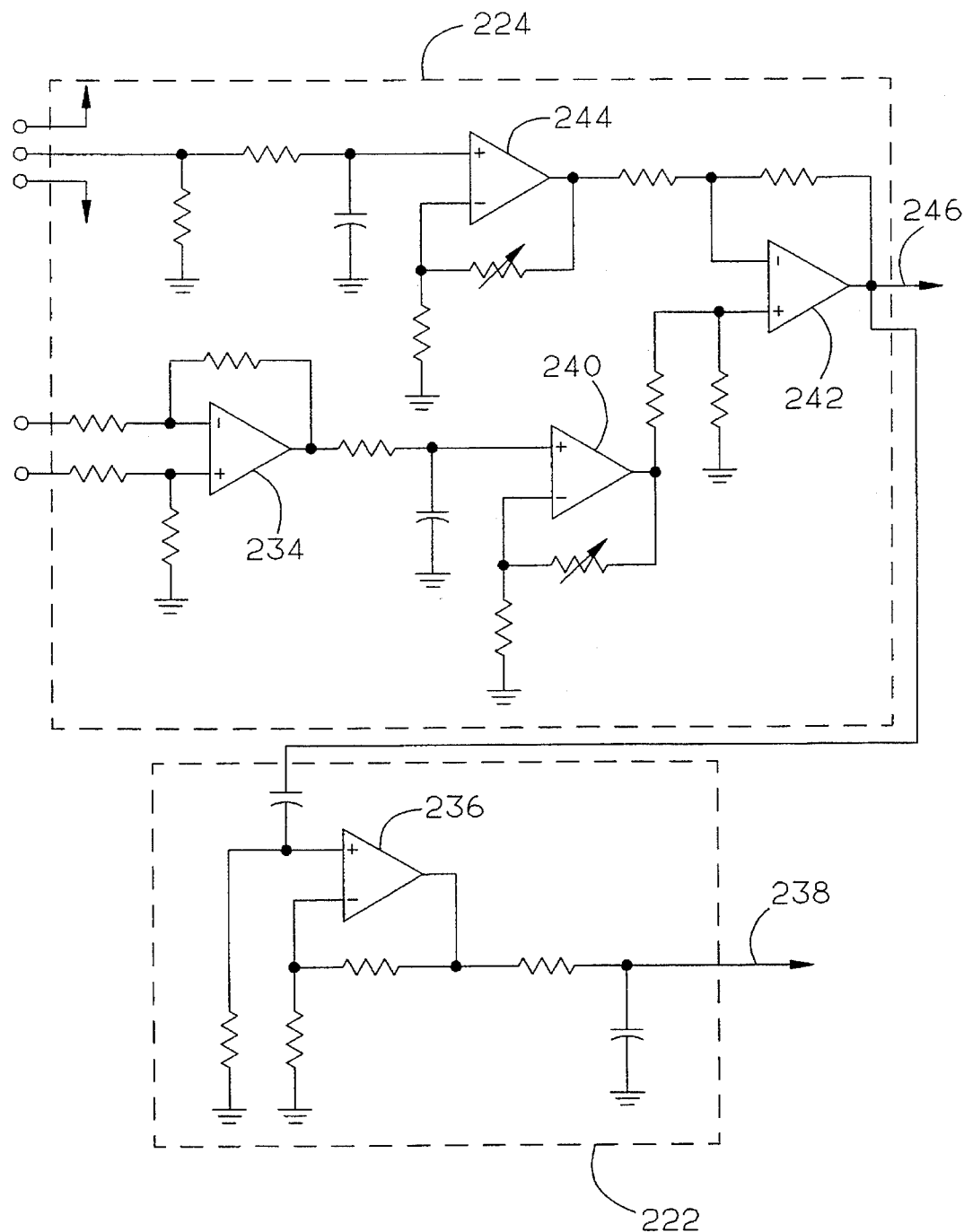
FIG. 4 is a schematic diagram of a circuit for performing relational comparison of AC and DC current sense signals in accordance with an aspect of the instant invention.

FIG. 4 illustrates an analog implementation of an aspect of an exemplary embodiment of the instant invention. Specifically, FIG. 4 illustrates the circuits 222 and 224 of FIG. 3 in schematic detail. The AC sense signal developed across resistor 232 is conditioned by input amplifier 234. This signal is further conditioned by amplifier 240 and input to a differential amplifier 242. The DC current sense signal from the Hall effect device is conditioned by amplifier 244 and input to the inverting input of differential amplifier 242 which outputs a fault signal on line 246 to be used by the logic means 228 to detect the presence of a differential protection fault. The AC ripple content of this signal is then monitored by amplifier 236 which outputs a fault signal on line 238 to be used by the logic means 228 to aid in discrimination of a differential fault location and to identify other, non differential faults such as open phase faults, open rectifier diode faults within the AC to DC converter 204, open CTs, et cetera.

The scaling circuitry and amplifiers of the relational function comparison circuit 224 provide compensation, when needed, for power loss and transformer step-up or step-down ratio (if used) which cause differences in the multiplier factor used to ensure proper tracking of the corresponding current level between AC and DC output current. Specifically, AC current is proportional to and linearly related to the sensed DC output current, until a fault occurs. Normally, the relation is described as:

$$I_{AC} = I_{DC} * K_1 + K_2$$

where $K_1$ and $K_2$ are fixed scale factors (constants) for any given hybrid power system. When the power system in use deviates from this equation, as indicated by an output on line 246, a differential fault has occurred within the system.

Figure 5:
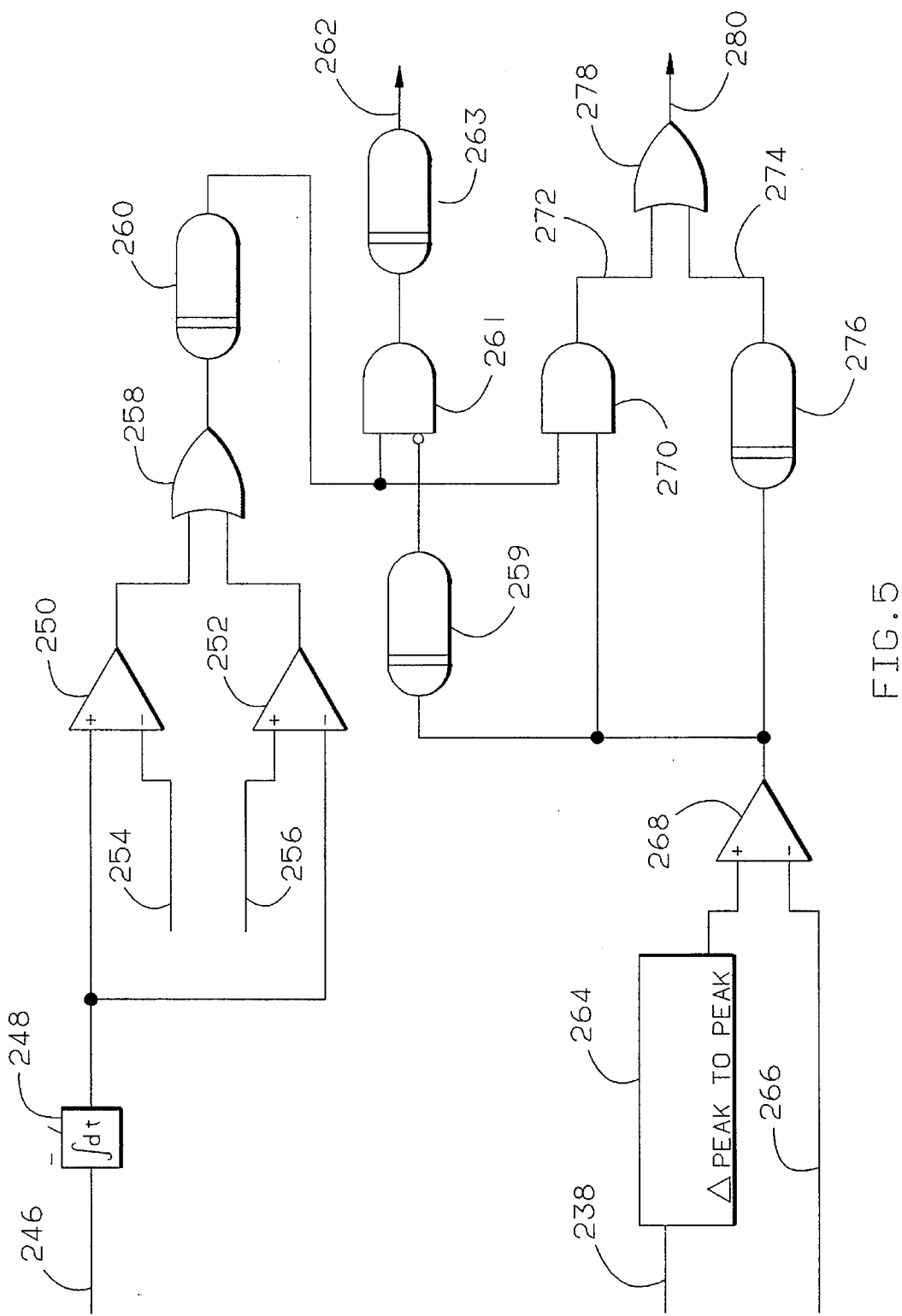
FIG. 5 is a schematic logic diagram of a circuit for distinguishing between faults in the AC portion of the hybrid AC/DC system and faults in the DC portion of the hybrid system.

The location of this differential fault is discriminated by logic means 228, shown in FIG. 5 in greater detail. The output from differential amplifier 242 is input via line 246 through a low pass filter 248 to a pair of differential amplifiers 250 and 252 which compare the fault signal with a predetermined threshold, positive and negative, on lines 254 and 256 respectively. Preferably, these thresholds are set to detect a nominal difference of +/−60 Ampere DC, although this value is set based on specific system specifications and may be varied substantially without departing from the spirit of the invention. If the magnitude of the fault signal 246 exceeds either threshold, an output signal is generated and passed through logical OR gate 258. The output from this OR gate 258 is delayed by time delay 260 before enabling AND gate 261. If, in addition, the peak to peak AC ripple difference, as calculated by circuit 264 from signal 238, does not exceed a predetermined threshold on line 266 (as indicated by a low output of differential amplifier 268 delayed by time delay 259) for a predetermined time 263, an output 262 is generated indicating the presence of a differential fault. If, however, in addition to an output from time delay 260, the peak to peak AC ripple difference does exceed the predetermined threshold 266 (as indicated by a high output of differential amplifier 268), an output 272 is generated by logical AND gate 270 indicating that the differential fault is located within the AC portion of the hybrid system, including the AC to DC converter 204.

If no differential fault is indicated (no output from OR gate 258), but the AC ripple of signal 238 still exceeds the predetermined threshold on line 266, a fault is indicated on line 274 after the expiration of time delay 276 indicating a short on 206⁺. In the preferred embodiment of the instant invention, this predetermined threshold is set to detect greater than a 30 Ampere AC primary equivalent peak-peak variation, although this value is set based on specific system specifications and may be varied substantially without departing from the spirit of the invention. Since the type of fault which can result in a sensed AC unbalance current flow can only occur in the AC portion of the hybrid system, this signal 274 is logically OR'ed via OR gate 278 with the differential fault current signal 272 to generate a fault signal on line 280 indicating that a fault exists in the AC portion of the hybrid system. Coordination between the differential fault signal 272 and the generation of signal 262 which indicates that the differential fault exists in the DC portion of the system is provided by time delay 260, i.e. if a differential fault is indicated as being located in the AC portion, it is isolated prior to indicating that it is in the DC portion.

A preferred method of protecting a hybrid AC/DC electric power generation and distribution system, therefore, comprises the steps of sensing the AC current generated by the source of AC power 200, sensing the DC current produced by the AC to DC converter 204, comparing the sensed AC current and the sensed DC current through an unfaulted system transfer function, and generating a first fault signal in response to a variance between the sensed AC current and the sensed DC current exceeding the relationship calculated by the unfaulted system transfer function by a first predetermined threshold indicating the presence of a differential current fault. Preferably, the protection method further comprises the steps of monitoring the ripple content of the sensed AC current, comparing the ripple content to a second predetermined threshold, and generating a second fault signal when the ripple content exceeds the second predetermined threshold indicating the presence of a fault upstream of the AC to DC converter. Further, preferably, the protection method comprises the steps of comparing the first fault signal and the second fault signal, and generating a third fault signal when both the first fault signal and the second fault signal are true, indicating the presence of a differential current fault upstream of the AC to DC converter.

Numerous modifications and alternative embodiments of the invention will now be apparent to those skilled in the art in view of the foregoing description. Specifically, the implementation of the functions performed in detecting and isolating faults within a hybrid AC/DC electric power generation and distribution system, while disclosed as a combination of analog and digital circuitry, may be practiced with other technologies such as, for example, software. Accordingly, this description is to be construed as illustrative only. The details of the structure may be varied substantially without departing from the spirit of the invention, and the exclusive rights in all modifications which come within the scope of the appended claims is reserved.

We claim:

1. A system of protection for an AC/DC hybrid electric power generation and distribution system having an AC portion comprising at least one source of AC power producing AC current coupled by first power feeders to a DC portion comprising at least one AC to DC converter producing DC current, the DC current being coupled by second power feeders to utilization equipment, comprising:

first means for sensing the AC current, said first means producing a first current sense signal proportional in magnitude to the AC current, said first means defining an entrance to a zone of protection;

second means for sensing the DC current, said second means producing a second current sense signal proportional in magnitude to the DC current, said second means defining an exit from said zone of protection; and third means coupled to said first means and said second means for relationally comparing said first current sense signal with said second current sense signal, said third means detecting the presence of a differential current fault within said zone of protection thereby, and generating a first fault signal in response thereto.

2. The system of protection as defined in claim 1, wherein said first means are positioned within said AC/DC hybrid electric power generation and distribution system so as to include the source of AC power within said zone of protection.

3. The system of protection as defined in claim 2, wherein said second means are positioned within said AC/DC hybrid electric power generation and distribution system so as to include the second power feeders within said zone of protection.

4. The system of protection as defined in claim 1, wherein said first current sense signal contains a magnitude ripple, and wherein said third means further monitors said magnitude ripple to determine the presence of an unbalance current fault within said AC/DC hybrid electric power generation and distribution system, said third means generating a second fault signal in response thereto.

5. The system of protection as defined in claim 4, wherein said third means further compares said first fault signal and said second fault signal to distinguish between faults within said AC portion from faults within said DC portion of said AC/DC hybrid electric power generation and distribution system.

6. A system of protection for an AC/DC hybrid electric power generation and distribution system having at least one source of AC power producing AC current coupled by first power feeders to at least one AC to DC converter producing DC current, the DC current being coupled by second power feeders to utilization equipment, comprising:

first means for sensing the AC current, said first means producing a first current sense signal proportional in magnitude to the AC current, said first means defining an entrance to a zone of protection;

second means coupled to said first means for rectifying said first current sense signal, said second means producing a first rectified current sense signal thereby;

third means for sensing the DC current, said third means producing a third current sense signal proportional in magnitude to the DC current, said third means defining an exit from said zone of protection; and fourth means coupled to said second means and said third means for relationally comparing said first rectified current sense signal and said third current sense signal, said fourth means generating a first fault signal in response to a variance between said first rectified current sense signal and said third current sense signal exceeding a predetermined relationship between said signals existing in an unfaulted state.

7. The system of protection of claim 6, wherein said first rectified current sense signal contains a current ripple, and wherein said fourth means further monitors said current ripple generating a second fault signal in response to said current ripple exceeding a predetermined threshold.

8. The system of protection of claim 7, further comprising a fifth means coupled to said fourth means for logically comparing said first fault signal and said second fault signal, said fifth means discriminating between faults on said second feeders from faults on said first power feeders and in said at least one AC to DC converter.

9. A system of protection for an AC/DC hybrid electric power generation and distribution system having an AC synchronous generator having at least one polyphase AC output coupled through a rectifier to a DC bus, comprising:

first means for sensing AC current generated by the AC synchronous generator, said first means producing an AC current sense signal;

second means for sensing DC current flowing on the DC bus, said second means producing a DC current sense signal;

third means coupled to said first means for rectifying said AC current sense signal, said third means producing a rectified current sense signal thereby; and fourth means coupled to said second means and said third means for processing said DC current sense signal and said rectified current sense signal in accordance with a predetermined function, said fourth means generating a first error signal in response to a difference between said processed DC current sense signal and said processed rectified current sense signal.

10. The system of protection of claim 9, wherein said predetermined function compensates for differences in current magnitude and type through a linear, proportional function equating said DC current sense signal and said rectified current sense signal.

11. The system of protection of claim 9, further comprising fifth means responsive to said first error signal and said rectified current sense signal for logically determining a location of a fault.

12. The system of protection of claim 11, wherein said rectified current sense signal contains ripple current, and wherein said fifth means monitors said ripple current, generating a first fault signal indicating a fault located upstream of the DC bus when said ripple current exceeds a first predetermined threshold.

13. The system of protection of claim 11, wherein said fifth means monitors said first error signal, generating a second fault signal indicating a differential current fault on the DC bus when said first error signal exceeds a second predetermined threshold for a second predetermined time.

14. The system of protection of claim 11, wherein said rectified current sense signal contains ripple current, and wherein said fifth means monitors said ripple current, generating a first fault signal indicating a fault located upstream of the DC bus when said ripple current exceeds a first predetermined threshold, and wherein said fifth means further monitors said first error signal, generating a second fault signal indicating a differential current fault on the DC bus when said first error signal exceeds a second predetermined threshold, and wherein said fifth means further compares said first fault signal and said second fault signal, generating a third fault signal indicating a differential current fault upstream of the DC bus when said first fault signal and said second fault signal are both true.

15. A method of protecting a hybrid AC/DC electric power generation and distribution system having an AC portion comprising at least one source of AC power producing AC current coupled by first power feeders to a DC portion comprising at least one AC to DC converter producing DC current, the DC current being coupled by second power feeders to utilization equipment, comprising the steps of:

sensing the AC current generated by the source of AC power;

sensing the DC current produced by the AC to DC converter;

comparing the sensed AC current and the sensed DC current through an unfaulted system transfer function; and generating a first fault signal in response to a variance between the sensed AC current and the sensed DC current exceeding the relationship calculated by the unfaulted system transfer function by a first predetermined threshold indicating the presence of a differential current fault.

16. The method of claim 15, further comprising the steps of monitoring a ripple content of the sensed AC current, comparing the ripple content to a second predetermined threshold, and generating a second fault signal when the ripple content exceeds the second predetermined threshold indicating the presence of a fault upstream of the AC to DC converter.

17. The method of claim 16, further comprising the steps of comparing the first fault signal and the second fault signal, and generating a third fault signal when both the first fault signal and the second fault signal are true indicating the presence of a differential current fault upstream of the AC to DC converter.

* * * * *